United States Patent
Yamamoto et al.

(10) Patent No.: US 8,701,825 B2
(45) Date of Patent: Apr. 22, 2014

(54) MOUNTING STRUCTURE FOR DASH SILENCER

(75) Inventors: Hiroshi Yamamoto, Kasugai (JP); Shuichi Mizata, Kasugai (JP)

(73) Assignee: Howa Textile Industry Co., Ltd., Aichi (JP)

( * ) Notice: Subject to any disclaimer, the term of this patent is extended or adjusted under 35 U.S.C. 154(b) by 0 days.

(21) Appl. No.: 13/808,112

(22) PCT Filed: Jan. 27, 2012

(86) PCT No.: PCT/JP2012/051742
§ 371 (c)(1),
(2), (4) Date: Jan. 3, 2013

(87) PCT Pub. No.: WO2012/140933
PCT Pub. Date: Oct. 18, 2012

(65) Prior Publication Data
US 2013/0098707 A1 Apr. 25, 2013

(30) Foreign Application Priority Data
Apr. 12, 2011 (JP) .................................. 2011-087955

(51) Int. Cl.
*E04B 1/82* (2006.01)
(52) U.S. Cl.
USPC .......... 181/290; 181/284; 296/39.3; 296/211; 296/191
(58) Field of Classification Search
USPC .................. 181/290, 284; 296/39.3, 211, 191
See application file for complete search history.

(56) References Cited

U.S. PATENT DOCUMENTS

| | | | | |
|---|---|---|---|---|
| 4,422,222 A | * | 12/1983 | Notoya ........................... | 24/614 |
| 7,070,848 B2 | * | 7/2006 | Campbell ..................... | 428/137 |
| 7,080,712 B2 | * | 7/2006 | Tsuiki et al. .................. | 181/204 |
| 7,431,128 B2 | * | 10/2008 | Choi ............................. | 181/296 |
| 7,762,375 B2 | * | 7/2010 | Matsuyama et al. .......... | 181/290 |
| 7,823,693 B2 | * | 11/2010 | Boyce .......................... | 181/284 |

FOREIGN PATENT DOCUMENTS

| | | |
|---|---|---|
| JP | 3-93252 U | 9/1991 |
| JP | 08-276796 A | 10/1996 |
| JP | 2000-006734 A | 1/2000 |
| JP | 2005-329769 A | 12/2005 |

OTHER PUBLICATIONS

International Search Report for PCT Patent App. No. PCT/JP2012/051742 (Apr. 24, 2012).

* cited by examiner

*Primary Examiner* — Forrest M Phillips
(74) *Attorney, Agent, or Firm* — Cermak Nakajima LLP; Tomoko Nakajima

(57) ABSTRACT

In order to mitigate transmission to the passenger compartment of noise generated in the engine compartment, a dash silencer is installed on the passenger-compartment-side surface of the dash panel of an automobile, wherein the mounting operation is facilitated by improving the mounting structure for the dash silencer. A stud pin is provided to the passenger-compartment-side surface of the dash panel, a chevron-shaped slit is formed in the mat-shaped dash silencer, and the stud pin is inserted through the slit, whereby the dash silencer is mounted on the passenger-compartment-side surface of the dash panel, wherein, when the chevron-shaped slit is formed in the dash silencer, a lower portion separated by the slit is caused to project farther than the upper portion toward the passenger compartment, and the lower portion is caused to inflect into the passenger compartment so as to form a stepped shape.

5 Claims, 11 Drawing Sheets

MOUNTING STRUCTURE FOR DASH SILENCER

This application is a national phase entry under 35 U.S.C. §371 of PCT Patent Application No. PCT/JP2012/051742, filed on Jan. 27, 2012, which claims priority under 35 U.S.C. §119 to Japanese Patent Application No. 2011-087955, filed Apr. 12, 2011, both of which are incorporated by reference.

TECHNICAL FIELD

The present invention relates to for example a mounting structure for a dash silencer in which the transmission to the passenger compartment of noise generated in the engine compartment can be mitigated by providing the structure to the dash panel separating the engine compartment and the passenger compartment of an automobile.

TECHNICAL BACKGROUND

A dash silencer is a large (approximately 1400 mm×700 mm) part generally that can be formed in a mat shape composed of fiber laminate such as felt and glass wool, or a porous synthetic resin material such as urethane foam. As shown in FIG. 11, through holes 100 for accommodating the steering column, the glove box, or the like, as well as numerous other mounting round holes 200, can be provided to the dash silencer. In an automobile assembly plant, an operator installs the dash silencer by bringing the silencer into the automobile cabin in a folded state and inserting stud pins into the round holes 200 which are provided to the passenger-compartment-side surface of the dash panel in advance. The round holes 200 can be made slightly larger than the diameter of the stud pins to make the installation operation easy.

In the inventions described in Patent Documents 1 and 2 below, instead of the round holes 200, cross-shaped, T-shaped, or horizontal-slot-shaped cuts are formed in the dash silencer, and the stud pins are inserted so that the cuts are pushed open, whereby the dash silencer is installed on the passenger-compartment-side surface of the dash panel.

Further, in the invention described in Patent Document 3 below, which is related to a patent application filed by this applicant, a chevron-shaped slit is formed in the dash silencer, and a stud pin is inserted through the slit to allow mounting.

PRIOR ARTS LIST

Patent Document 1: Japanese Laid-open Patent Publication No. 8-276796
Patent Document 2: Japanese Laid-open Patent Publication No. 2000-6734
Patent Document 3: Japanese Laid-open Patent Publication No. 2005-329769

SUMMARY OF THE INVENTION

Problems to be Solved by the Invention

Forming a relatively large round, cross-shaped, T-shaped, or horizontal-slot-shaped cut to accommodate a stud pin as described above can have an issue that the dash silencer can easily move from side to side even after mounting. Another issue is that the cut can be torn and widened by the weight or vibration of the dash silencer, and the opening can become larger, resulting in the dash silencer sagging below reference points and the sound-blocking performance being degraded.

As shown in Patent Document 3, forming a chevron-shaped slit in the dash silencer can have the effect of minimizing the tearing, deformation, and sagging described above, however the fiber surface of the dash silencer can be fluffy and the location of the slit can be difficult to see with the naked eye. Therefore, mounting operations, such as aligning the slit with a stud pin and inserting the stud pin, can be difficult to perform.

An object of the present invention is to address issues related to mounting operations for such conventional dash silencers.

Means to Solve the Problems

To address the issues above, the mounting structure for a dash silencer according to an exemplary embodiment of the present invention includes: a stud pin provided to the passenger-compartment-side surface of a dash panel; a chevron-shaped slit formed in a mat-shaped dash silencer; and the stud pin being inserted through the slit, whereby the dash silencer is mounted on the passenger-compartment-side surface of the dash panel. The structure is arranged so that when the chevron-shaped slit is formed in the dash silencer, a lower portion separated by the slit can inflect toward the passenger compartment so as to form a stepped shape in which the lower portion projects farther than the upper portion toward the passenger compartment.

The mounting structure for a dash silencer according to an exemplary embodiment the present invention is arranged such that a protruding portion formed on one die surface fits into a recessed portion formed on another die surface, and an edge of the protruding portion and an edge of the recessed portion are placed in sliding contact with each other, whereby a chevron-shaped slit is formed in the dash silencer, and the lower portion separated by the slit is pressed into the recessed portion by the protruding portion, causing the lower portion to inflect toward the passenger compartment.

Advantageous Effects of the Invention

The location where the chevron-shaped slit is formed in the dash silencer is easy to see, and the mounting operation is facilitated.

Also, by mounting the dash silencer in this manner, sagging and movement of the mounted dash silencer can be eliminated, and excellent sound-blocking performance can be maintained over an extended period of time.

DESCRIPTION OF THE EMBODIMENTS

Figure 1:
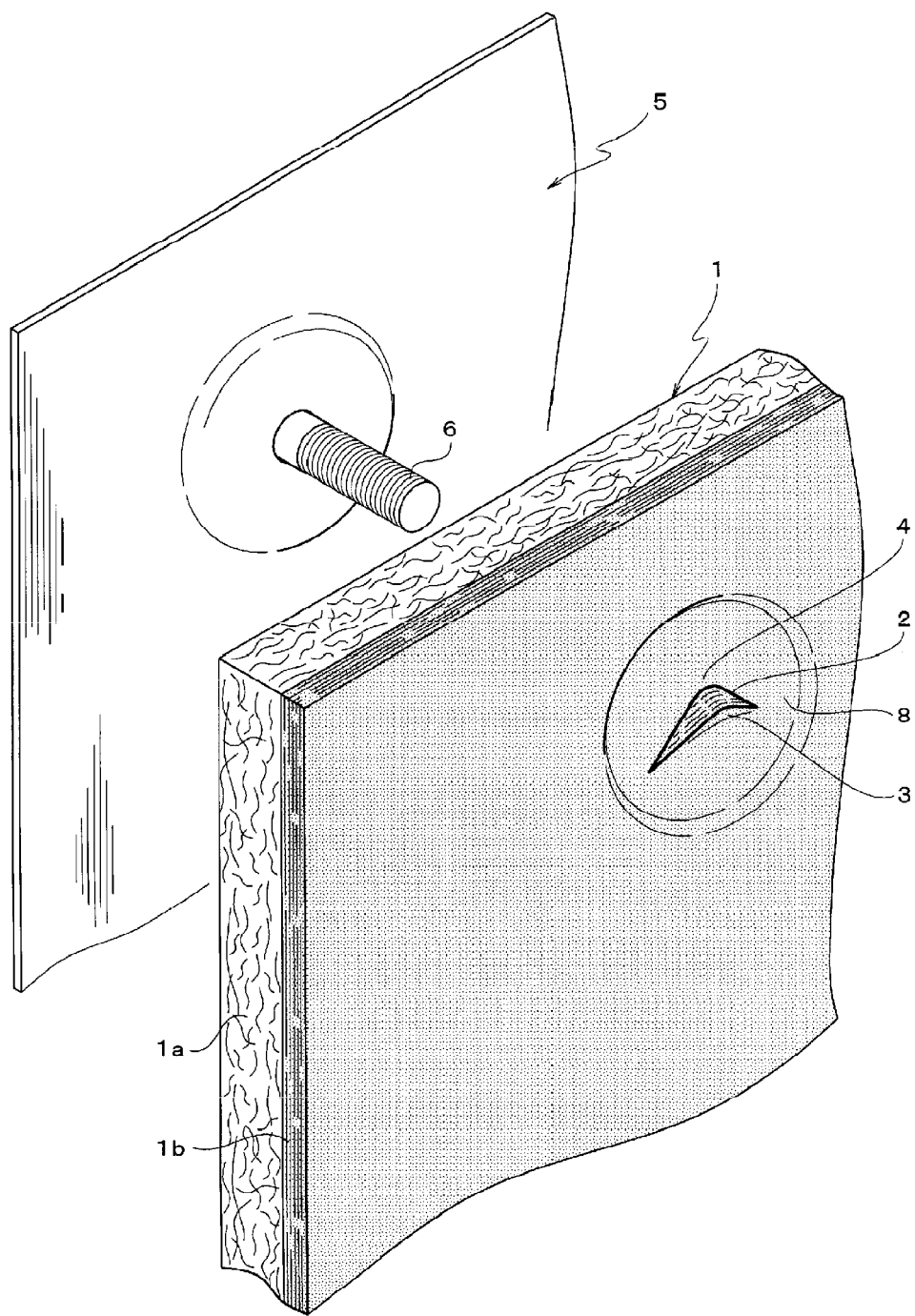
FIG. 1 is a perspective view of the relevant parts of the dash silencer according to an exemplary embodiment of the present invention before mounting.
Figure 2:
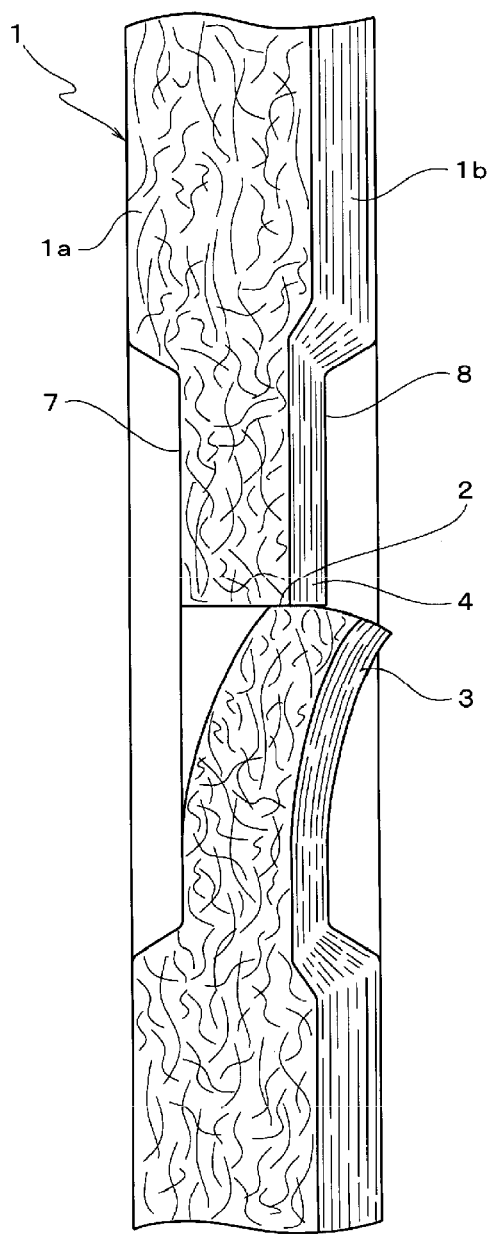
FIG. 2 is a longitudinal cross sectional view of the relevant parts of the dash silencer according to an exemplary embodiment of the present invention.
Figure 3:
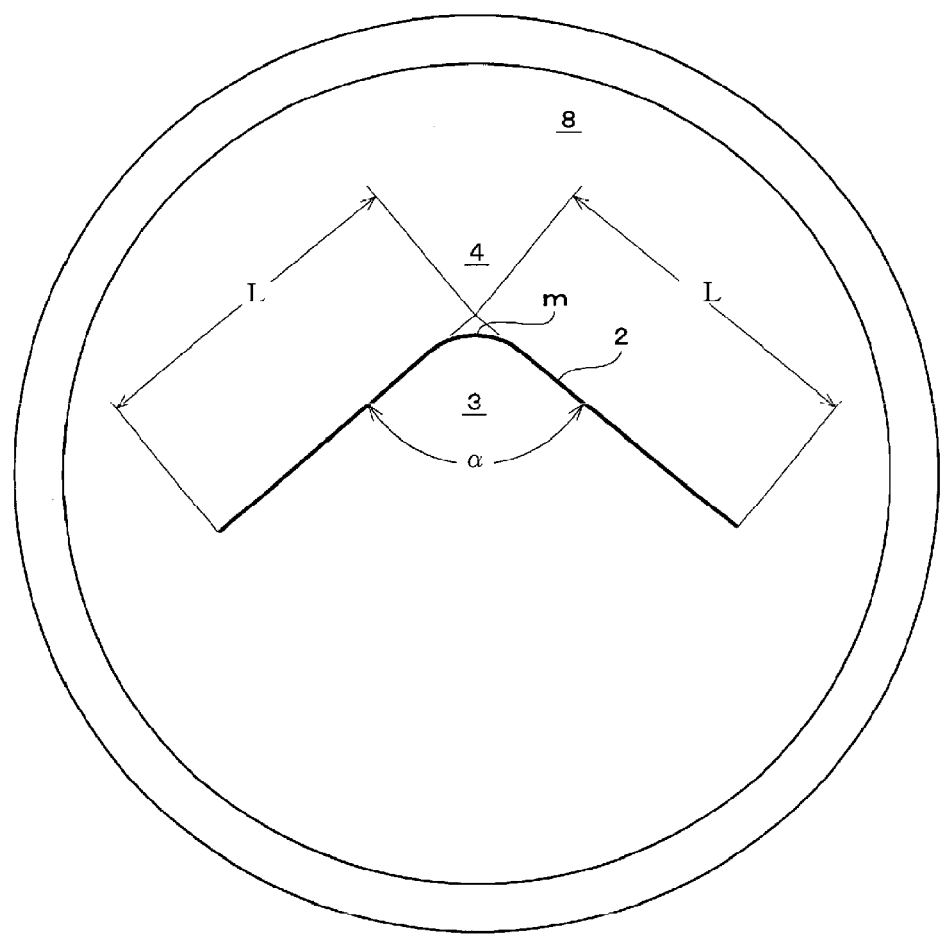
FIG. 3 is a front view of the relevant parts of the dash silencer according to an exemplary embodiment of the present invention.

The dash silencer 1 shown in FIGS. 1 and 2 is formed by heating and pressing a fiber laminate body including thermoplastic resin fiber, cotton, natural fibers, or the like, into a mat shape having a thickness of between 10 and 20 mm and having a soft layer 1a and a hard layer 1b. A chevron-shaped slit 2 is formed in the area of the silencer where mounting is required, and a lower portion 3 separated by the slit 2 is caused to project farther than the upper portion 4 toward the passenger compartment and is inflected toward the passenger compartment so as to form a stepped shape. Namely, the left side of the dash silencer 1 in FIG. 2 shows the engine-compartment side, and the right side of the silencer shows the passenger-compartment side, and the configuration is such that the lower portion 3 is inflected toward the passenger compartment. 5 is a dash panel, and 6 is a stud pin of shaft diameter 5 to 6 mm that is provided to the passenger-compartment-side surface of the dash panel 5. As shown in the front view of the relevant part of the dash silencer 1 in FIG. 3, the apex angle a of the chevron shape of the slit 2 is set to from 50 to 150° (ideally an obtuse angle of approximately 100°, and the side length L is set to from 5 to 20 mm as appropriate in accordance with the shaft diameter of the stud pin 6. Also, the top m of the chevron shape is formed in an arc shape that follows the outer periphery of the stud pin 6.

Figure 4:
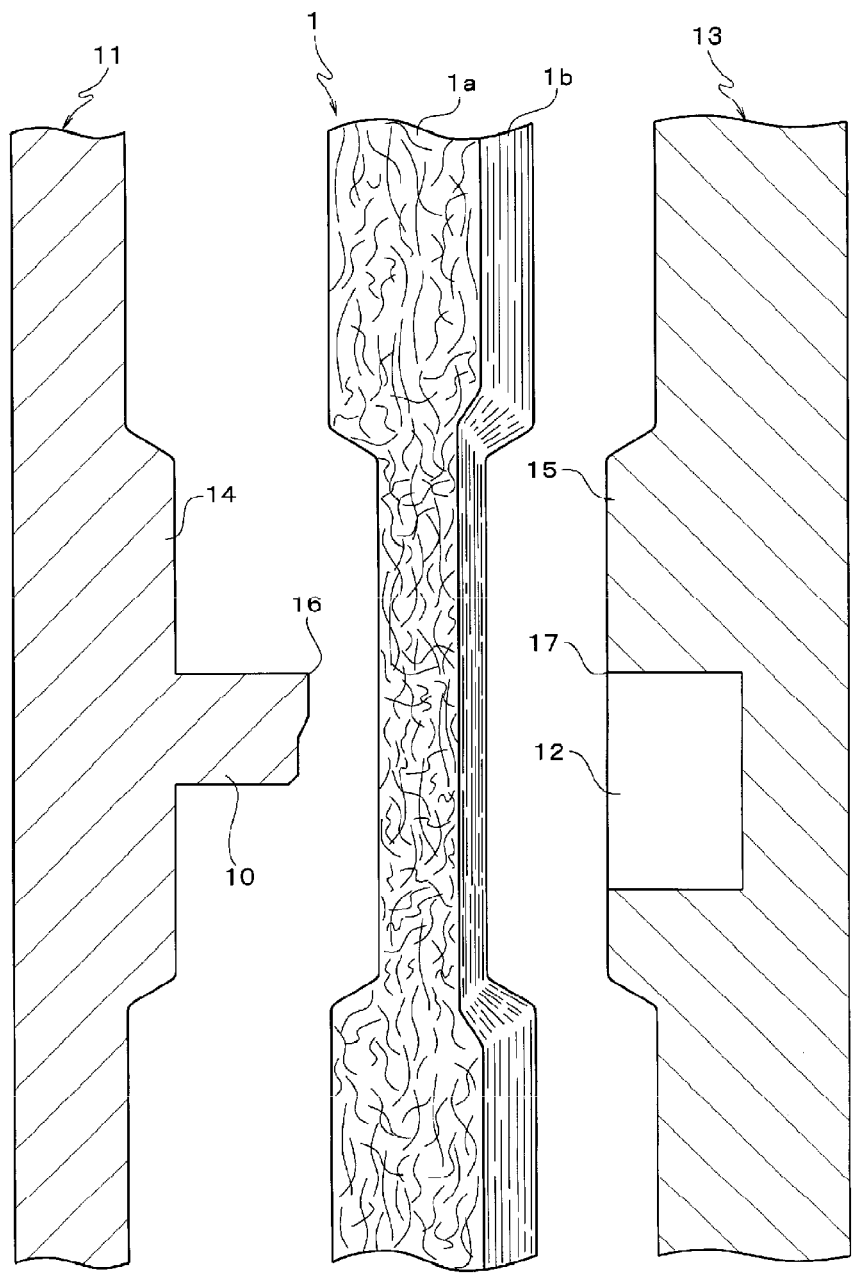
FIG. 4 is a longitudinal cross sectional view of a die for forming the dash silencer according to an exemplary embodiment of the present invention, and of the relevant parts of the dash silencer.
Figure 5:
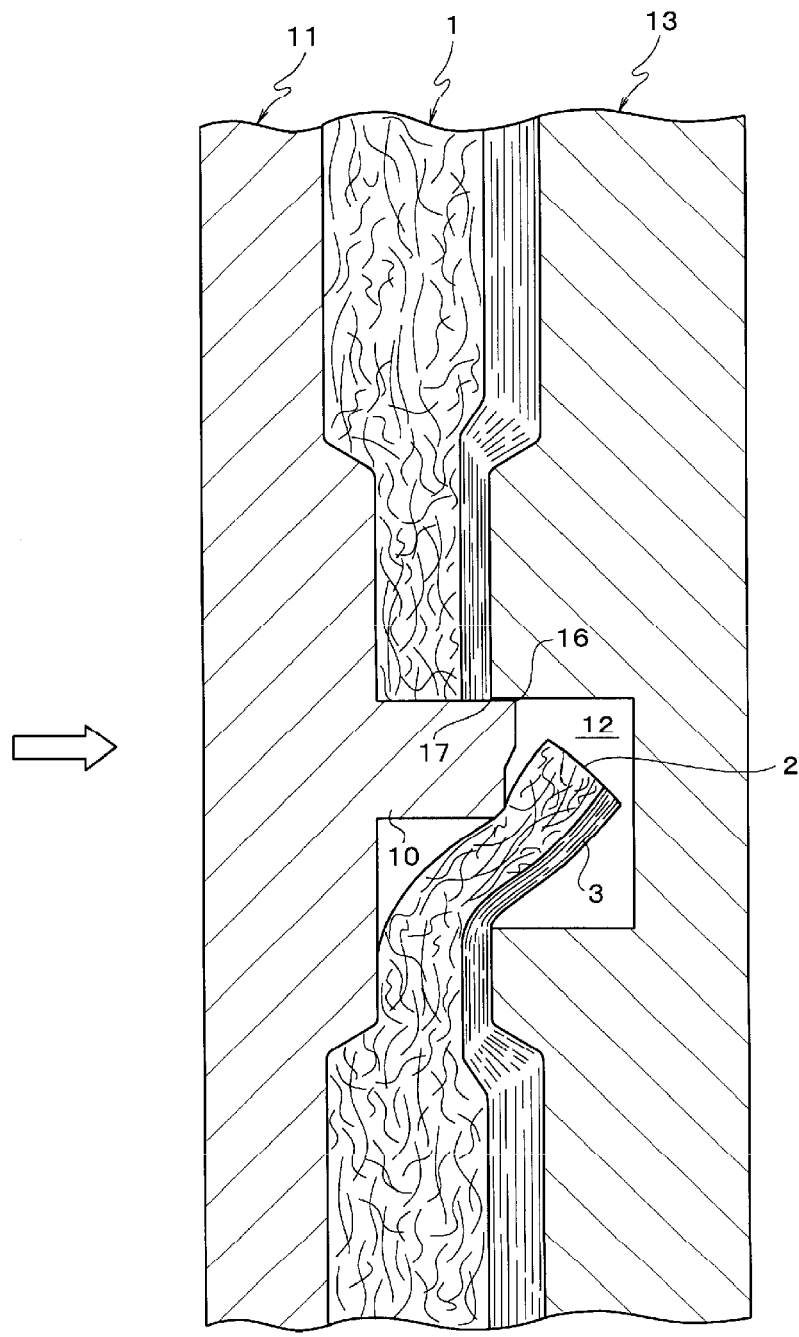
FIG. 5 is an operational diagram of the die in FIG. 1.
Figure 6:
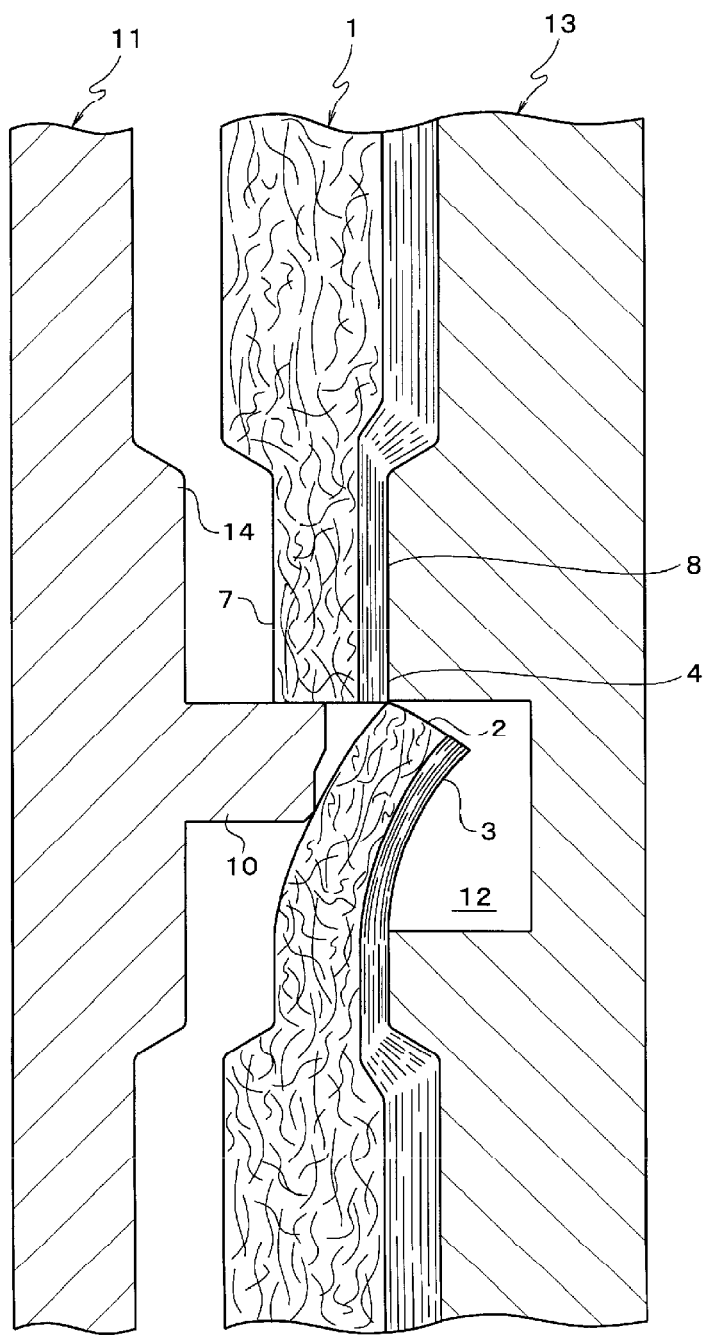
FIG. 6 is an operational diagram of the die in FIG. 1.

Next, according to FIGS. 4 to 6, a metal die for forming the slit 2 in the dash silencer 1 will be explained. As shown in FIG. 4, one die 11 forms a protruding portion 10 on which the top edge 16 is formed into a chevron shape, while another die 13 forms a recessed portion 12 that accommodates the protruding portion 10 with some play, forming a chevron shape such that the top edge 17 of the recessed portion 12 slides against the top edge 16 of the protruding portion 10. The dash silencer 1 is located between the dies 11 and 13, and the dies 11 and 13 are brought together as shown in FIG. 5, causing the protruding portion 10 to fit into the recessed portion 12. At this time, the top edge 16 of the protruding portion 10 and the top edge 17 of the recessed portion 12 are placed in sliding contact with each other, forming a chevron-shaped slit 2 in the dash silencer 1. Also at this time, the lower portion 3 separated by the slit 2 is pressed against the protruding portion 10 and inflected into the recessed portion 12, resulting in a stepped shape in which the lower portion 3 projects farther than the upper portion 4, as shown in FIG. 6, even when the dies 11 and 13 retract to their original positions.

Also, expanded projections 14 and 15 are formed, respectively, on the dies 11 and 13; and collapsed and stiffened indented areas 7 and 8, which are more resistant to deformation than other areas, are formed around the slit 2 in the dash silencer 1.

The creation of through holes in the dash silencer 1 for the steering column, the glove box, and the like, as well as the trimming of the outer perimeter of the dash silencer 1, may be performed at the same time that the slit 2 is formed by the dies 11 and 13, as described above, but these through holes and the trimming may also be performed in advance using a different die.

Figure 7:
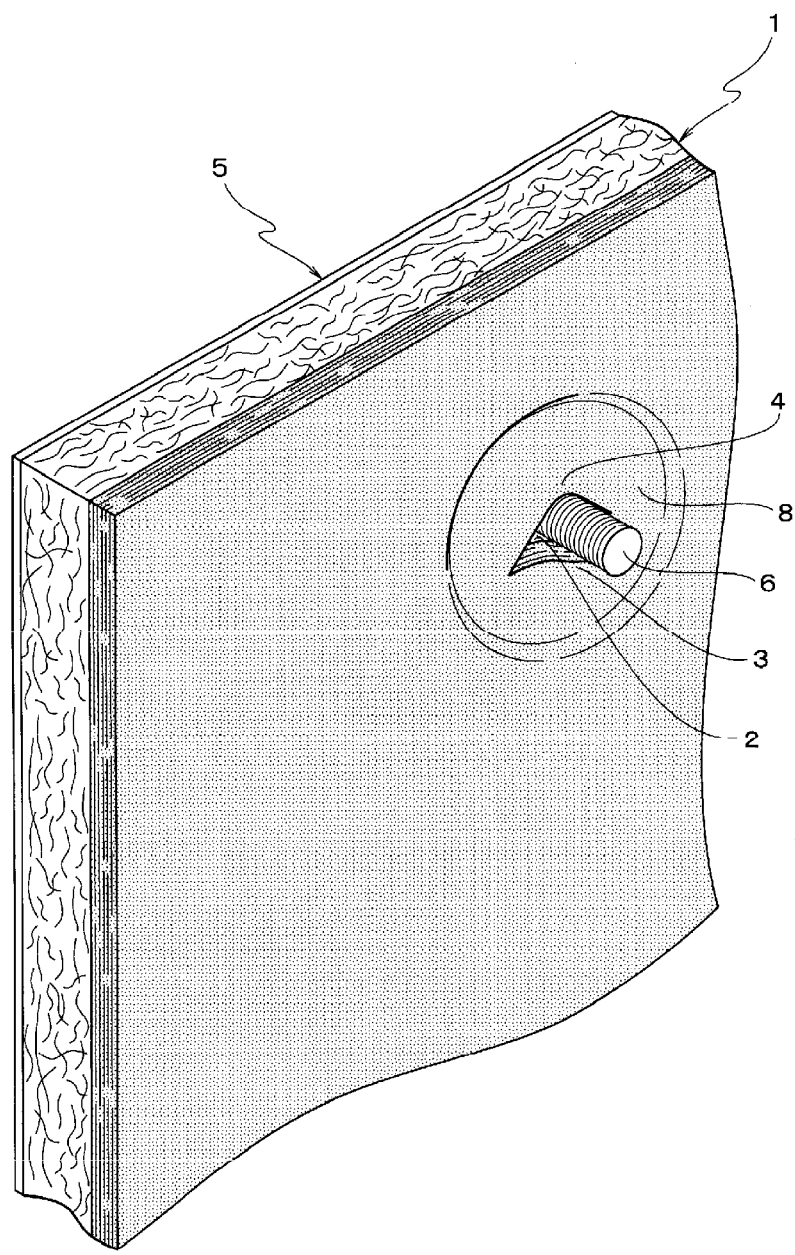
FIG. 7 is a perspective view of the relevant parts of the dash silencer according to an exemplary embodiment of the present invention during mounting.
Figure 8:
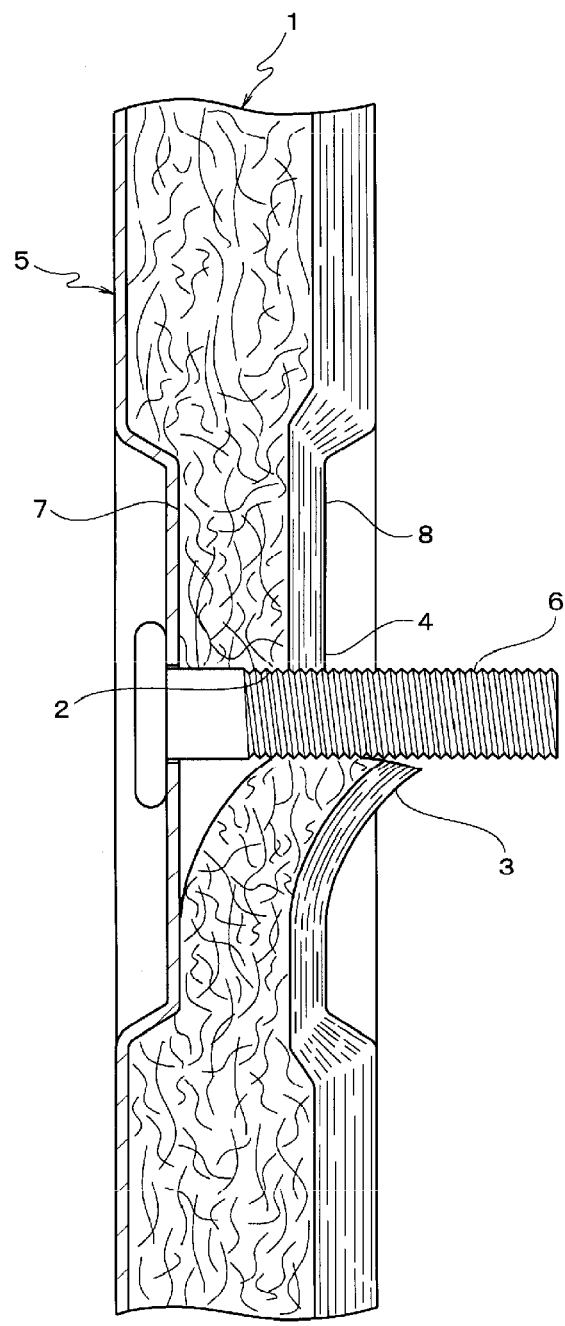
FIG. 8 is a longitudinal cross sectional view of the relevant parts of the dash silencer according to an exemplary embodiment of the present invention during mounting.
Figure 9:
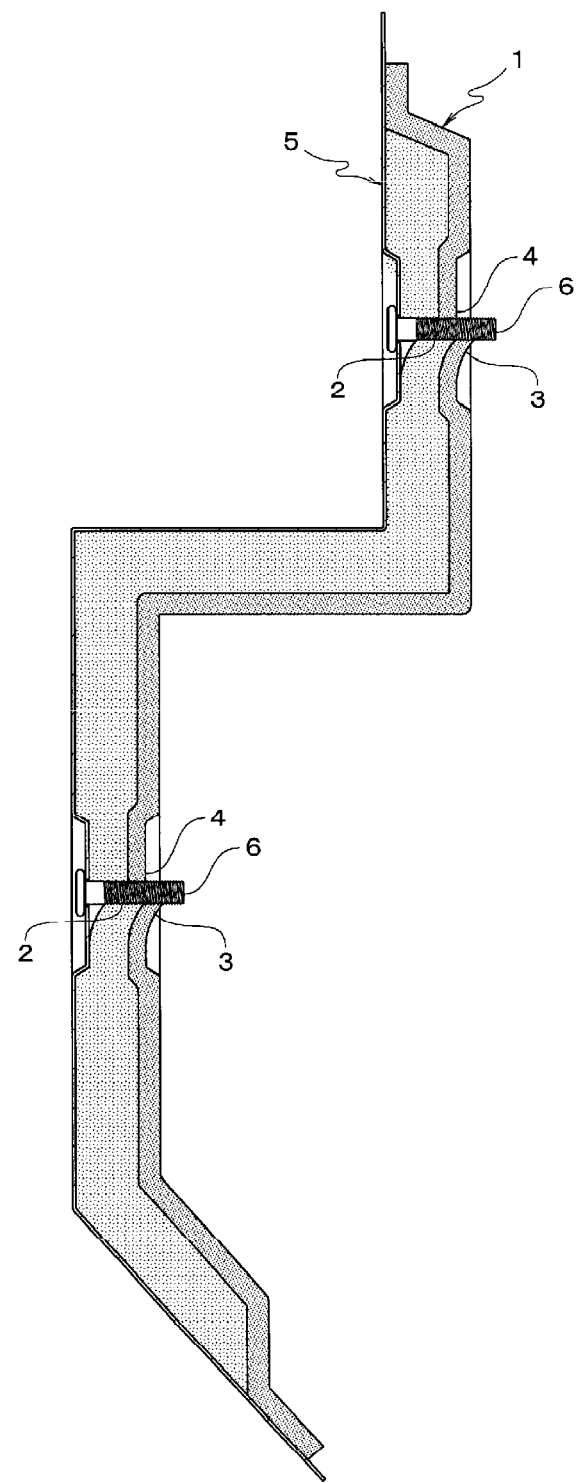
FIG. 9 is a longitudinal cross sectional view of the dash silencer according to an exemplary embodiment of the present invention during mounting.

In an automobile assembly plant, an operator brings the dash silencer 1 into the automobile cabin in a folded state and inserts the stud pin 6 already provided to the passenger-compartment-side surface of the dash panel 5 into the slit 2, thereby mounting the dash silencer 1 on the passenger-compartment-side surface of the dash panel 5, as shown in FIGS. 7 to 9. The lower portion 3 of the slit 2 thus projects toward the passenger compartment in a stepped shape when the stud pin 6 is inserted. Therefore, even if the fiber surface of the dash silencer 1 is fluffy, the operator can easily discover the location of the slit 2 and can easily insert the stud pin 6, allowing a significant improvement in the efficiency of the mounting operation.

Figure 10:
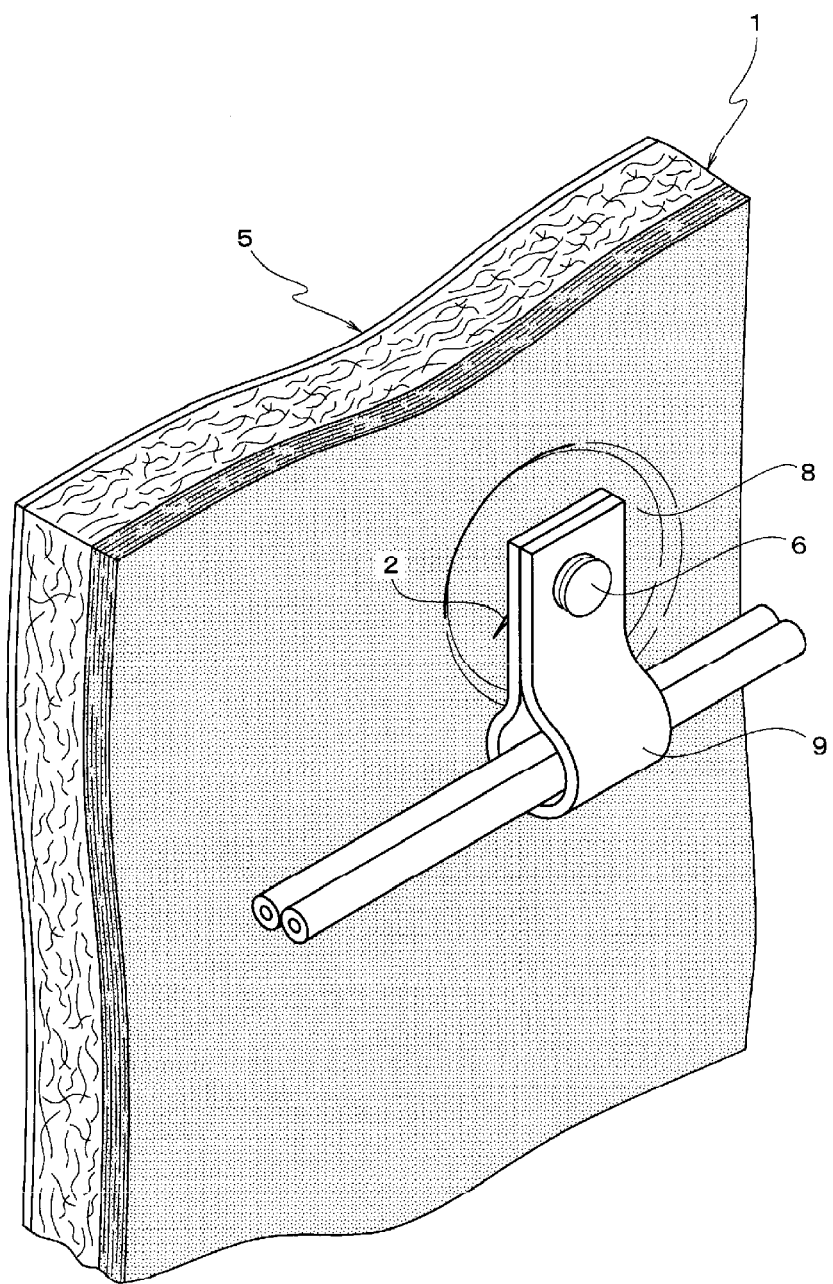
FIG. 10 is a perspective view of the relevant parts of the dash silencer according to an exemplary embodiment of the present invention during mounting.
Figure 11:
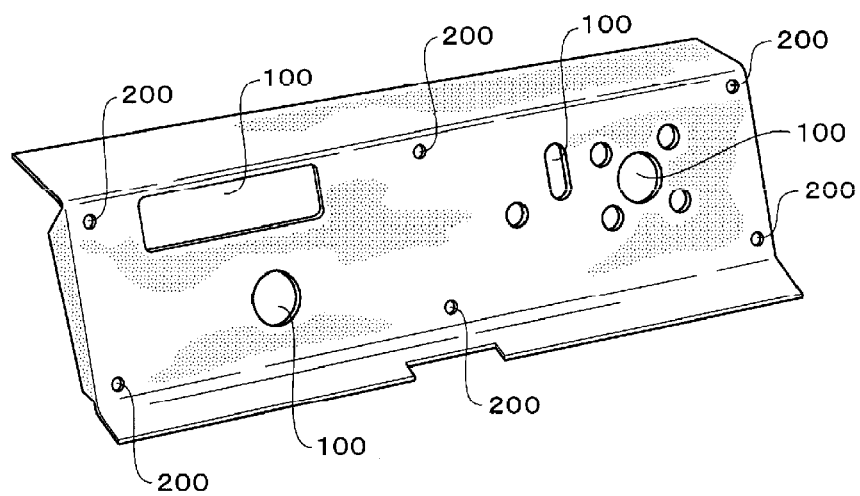
FIG. 11 is a perspective view of a conventional dash silencer.

By mounting the dash silencer 1 in this manner, it is possible to bring the stud pin 6 into contact with the upper portion 4 of the slit 2 and to stably support the dash silencer 1, distributing the weight of the dash silencer 1 diagonally downward on both sides from the upper portion 4. This allows the upper portion 4 to be supported in a state that resists deformation. Therefore, there is no concern that the dash silencer 1 will sag significantly or move laterally due to gravity or vibration during automotive travel. Also, because the lower portion 3 of the slit 2 normally overhangs the bottom side of the stud pin 6, it is possible to minimize the gap around the stud pin and to minimize sound leakage through the gap. For this reason, the transmission to the passenger compartment of sound generated in the engine compartment is mitigated by the dash silencer 1, and high sound-blocking performance is maintained over an extended period of time. A wire harness 9 or the like can be attached to the tip of the stud pin 6 as needed, as demonstrated in FIG. 10.

Although it is not shown in the drawings, extending the slit 2 several millimeters downward at both ends allows the lower portion 3 to inflect more easily toward the passenger compartment and the step that projects toward the passenger compartment to be enlarged; therefore, it is also acceptable to adopt an aspect in which the cut 2 extends several millimeters downward at both ends in this manner.

DESCRIPTION OF REFERENCE NUMERALS

1: dash silencer
2: slit
3: lower portion
4: upper portion
5: dash panel
6: stud pin
10: protruding portion
11: die
12: recessed portion
13: die

The invention claimed is:

1. A mounting structure for a dash silencer, comprising:
   a mat-shaped dash silencer having
      a chevron-shaped slit formed in the dash silencer; and
      an upper portion and a lower portion which are separated from each other by the slit, wherein the lower portion has a stepped shape by inflecting toward the passenger compartment in a pre-mounted state so that the lower portion projects farther than the upper portion toward the passenger compartment.

2. The mounting structure for a dash silencer according to claim 1, further comprising:
- a stud pin provided to the passenger-compartment-side surface of a dash panel, the stud pin being inserted into the slit so that the dash silencer is mounted on the passenger-compartment-side surface of the dash panel.

3. The mounting structure for a dash silencer according to claim 1, wherein an apex angle of the chevron shape of the slit is set from 50 to 150 degree.

4. The mounting structure for a dash silencer according to claim 1, wherein a central portion of the chevron shaped slit is formed in an arc shape.

5. A molding apparatus for the mounting structure for a dash silencer according to claim 1, further comprising:
- a first die having a protruding portion having an edge; and
- a second die having a recessed portion having an edge,
- wherein the edge of the protruding portion and the edge of the recessed portion are placed in sliding contact with each other so as that the protruding portion fits into the recessed portion, and
- the lower portion separated by the slit is pressed into the recessed portion by the protruding portion.

\* \* \* \* \*